United States Patent
Chen et al.

(10) Patent No.: US 10,711,114 B2
(45) Date of Patent: Jul. 14, 2020

(54) PPTC COMPOSITION AND DEVICE HAVING THERMAL DEGRADATION RESISTANCE

(71) Applicant: Littelfuse, Inc., Chicago, IL (US)

(72) Inventors: Jianhua Chen, Sunnyvale, CA (US); Chun-Kwan Tsang, Morgan Hill, CA (US)

(73) Assignee: Littelfuse, Inc., Chicago, IL (US)

( * ) Notice: Subject to any disclaimer, the term of this patent is extended or adjusted under 35 U.S.C. 154(b) by 0 days.

(21) Appl. No.: 15/790,569

(22) Filed: Oct. 23, 2017

(65) Prior Publication Data

US 2019/0119464 A1 Apr. 25, 2019

(51) Int. Cl.
| | |
|---|---|
| *C08K 3/22* | (2006.01) |
| *H01C 7/02* | (2006.01) |
| *C08K 3/04* | (2006.01) |
| *H01H 85/147* | (2006.01) |
| *H01B 1/24* | (2006.01) |
| *H01B 1/20* | (2006.01) |
| *H01H 85/06* | (2006.01) |

(52) U.S. Cl.
CPC ............ *C08K 3/22* (2013.01); *C08K 3/04* (2013.01); *H01B 1/20* (2013.01); *H01B 1/24* (2013.01); *H01C 7/027* (2013.01); *H01H 85/147* (2013.01); *C08K 2003/2296* (2013.01); *C08K 2201/001* (2013.01); *H01H 85/06* (2013.01)

(58) Field of Classification Search
CPC . C08K 3/04; H01B 1/22; H01C 7/027; H01C 1/1406; H01C 7/02
USPC .......... 428/413; 524/425; 219/505; 252/511, 252/500, 502; 338/22
See application file for complete search history.

(56) References Cited

U.S. PATENT DOCUMENTS

| | | | |
|---|---|---|---|
| 4,188,276 A | 2/1980 | Kim et al. | |
| 4,315,237 A * | 2/1982 | Middleman | H01C 7/027 219/505 |
| 5,174,924 A * | 12/1992 | Yamada | C08K 3/04 252/502 |
| 5,925,276 A * | 7/1999 | Batliwalla | H01C 7/027 219/505 |
| 6,358,438 B1* | 3/2002 | Isozaki | H01C 7/02 252/500 |
| 6,593,843 B1* | 7/2003 | Becker | H01C 1/1406 338/22 R |
| 6,620,343 B1 | 9/2003 | Blok et al. | |
| 2002/0177644 A1* | 11/2002 | Blok | C08K 3/04 524/425 |
| 2004/0222406 A1 | 11/2004 | Chen et al. | |
| 2006/0051588 A1* | 3/2006 | Galla | H01B 1/22 428/413 |

(Continued)

FOREIGN PATENT DOCUMENTS

| | | |
|---|---|---|
| CN | 103762012 B | 8/2016 |
| WO | 9501642 A1 | 1/1995 |

OTHER PUBLICATIONS

Raven Blacks by Columbian Brochure—https://www.prismnet.com/~trag/Chemistry/Raven_Blk_Brochr.pdf.*

(Continued)

*Primary Examiner* — Khanh T Nguyen

(57) ABSTRACT

A polymer positive temperature coefficient (PPTC) material. The PPTC material may include a polymer matrix, a conductive filler, and a thermal stabilizer.

4 Claims, 5 Drawing Sheets

(56) References Cited

U.S. PATENT DOCUMENTS

2007/0187655 A1* 8/2007 Wang .................. H01B 1/22
                                                    252/511
2009/0244811 A1   1/2009 Pascenko
2009/0177644 A1*  7/2009 Martinez ............ G06Q 30/02

OTHER PUBLICATIONS

European Search Report and Written Opinion for the European Patent Application No. 18202056, dated Mar. 29, 2019, 8 pages.

\* cited by examiner

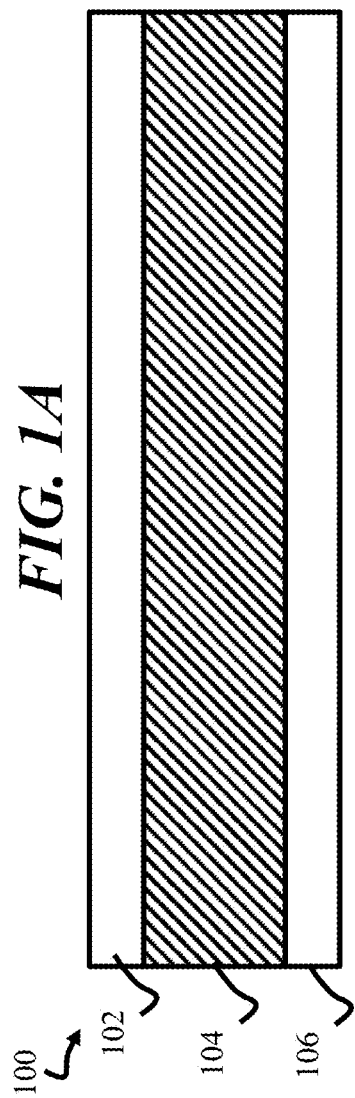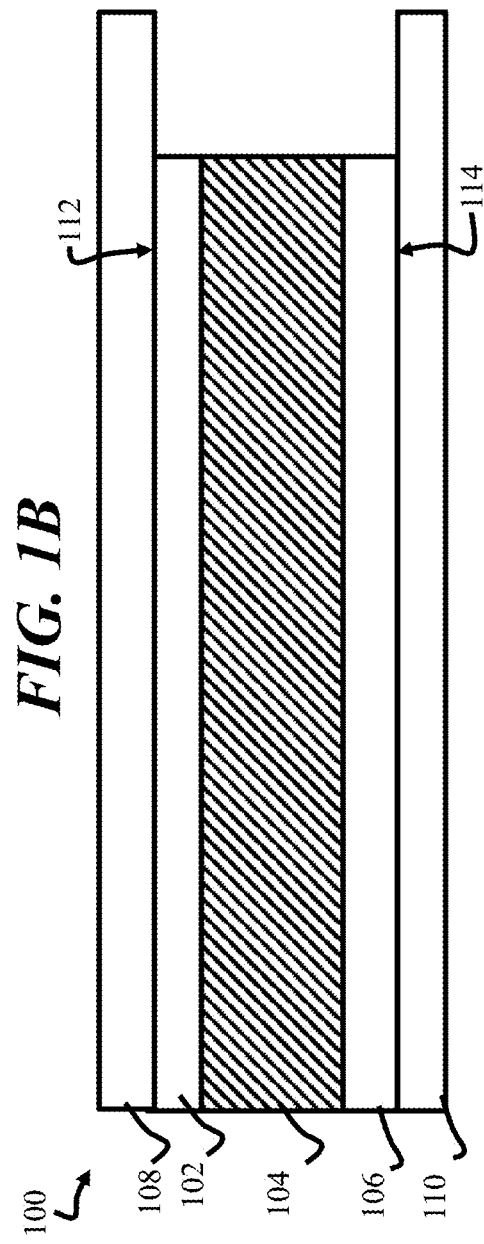

FIG. 3

| Thermal stabilizer | Volume% | After 285°C, air aging Appearance | Comments |
|---|---|---|---|
| None (control) | - | • Turn dark brown color, a lot of bubbles<br>• Brown small dots on slab | Heavily degraded |
| Zinc oxide | 4% | Turn yellow, no bubbles<br>No brown dots | Very little degradation |
| Titanium dioxide | 4% | Turn yellow<br>No bubbles<br>little brown dots | Little degradation |
| Antimony oxide | 4% | Turn yellow<br>No bubbles,<br>little brown dots | Little degradation |
| Calcium Carbonate | 4% | • Turn brown color,<br>• Small amount bubbles<br>• Brown small dots on slab | Mild degradation |

PPTC COMPOSITION AND DEVICE HAVING THERMAL DEGRADATION RESISTANCE

BACKGROUND

Field

Embodiments relate to the field of circuit protection devices, including fuse devices.

Discussion of Related Art

Polymer positive temperature coefficient (PPTC) devices may be used as overcurrent or over-temperature protection device, as well as current or temperature sensors, among various applications. In overcurrent or over-temperature protection applications, the PPTC device may be considered a resettable fuse, designed to exhibit low resistance when operating under designed conditions, such as low current. The resistance of the PPTC device may be altered by direct heating due to temperature increase in the environment of the circuit protection element, or via resistive heating generated by electrical current passing through the circuit protection element. For example, a PPTC device may include a polymer material and a conductive filler that provides a mixture that transitions from a low resistance state to a high resistance state, due to changes in the polymer material, such as a melting transition or a glass transition. At such a transition temperature, sometimes called a trip temperature, where the trip temperature may often range from room temperature or above, the polymer matrix may expand and disrupt the electrically conductive network, rendering the composite much less electrically conductive. This change in resistance imparts a fuse-like character to the PPTC materials, which resistance may be reversible when the PPTC material cools back to room temperature.

In applications, such as automotive applications, a PPTC device works as a overcurrent/overtemperature protection which relies on conductive particle-filled polymer composites that show low resistance at lower current or below polymer temperature (ground state), when fault current or overtemperature event occurs, PPTC become high resistance and stop the current flow. Materials of known PPTC devices include those based on polyvinylidene fluoride melting point (~177 C) and polyethylene(~123 C). However, for use of a PPTC as a circuit in car windows lifting motor, the performance may be less than satisfactory for such devices. In known systems for controlling power windows, a PPTC device is designed to trip at a designated trip temperature and enter a high resistance state, when a fault current is present, for example, to protect components of the system. The fault current may be such that the PPTC material exceeds its trip temperature as excessive fault current passes through the PPTC device. However, other sources of heat may inadvertently cause the PPTC device to trip, even when no fault current is present. For example, when current is cycle for up and down operation at 80 C operating temperature, simulating operation in a power window, the PPTC material may heat up and exceed its trip temperature. In an actual window motor application, such a failure causes the window not to function, even though no actual fault current is present.

Additionally, while a given PPTC device may function adequately for a short while, degradation of device properties may take place when the PPTC device experiences elevated temperature for an extended cumulative time. With respect to these and other considerations, the present disclosure is provided.

BRIEF SUMMARY

In one embodiment, a polymer positive temperature coefficient (PPTC) material, may include a polymer matrix, a conductive filler, and a thermal stabilizer.

In a further embodiment, a fuse device may include a polymer positive temperature coefficient (PPTC) body. The fuse device may further include a first electrode, disposed on a first side of the PPTC body; a second electrode, disposed on a second side of the PPTC body, wherein the PPTC body comprises a polymer matrix, a conductive filler, and a thermal stabilizer.

BRIEF DESCRIPTION OF THE DRAWINGS

FIG. 1A to FIG. 1E show PPTC devices according to various embodiments of the disclosure;

FIG. 3 presents a summary view of results from exposure of various PPTC formula samples after exposure to 285 C in air;

DESCRIPTION OF EMBODIMENTS

Figure 1C:
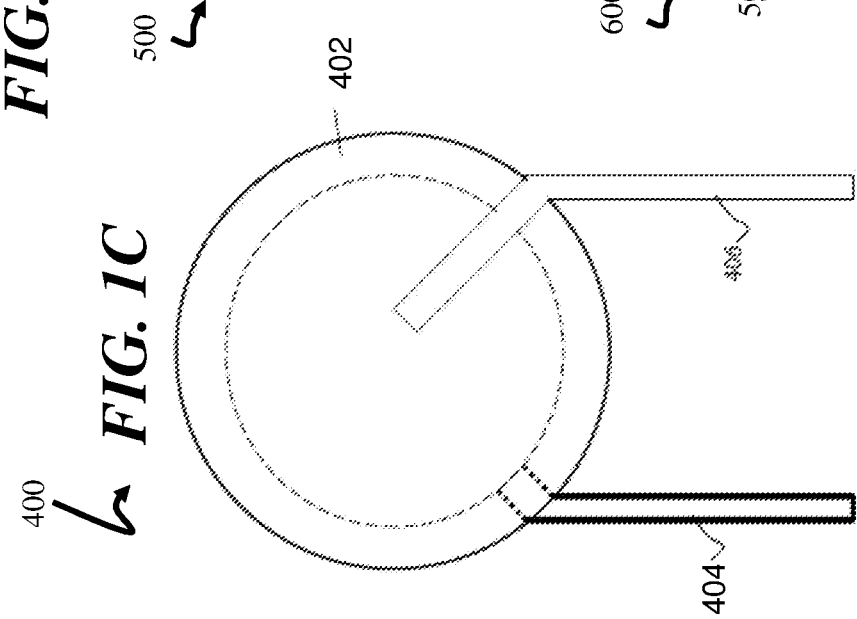

The present embodiments will now be described more fully hereinafter with reference to the accompanying drawings, in which exemplary embodiments are shown. The embodiments are not to be construed as limited to the embodiments set forth herein. Rather, these embodiments are provided so that this disclosure will be thorough and complete, and will fully convey their scope to those skilled in the art. In the drawings, like numbers refer to like elements throughout.

In the following description and/or claims, the terms "on," "overlying," "disposed on" and "over" may be used in the following description and claims. "On," "overlying," "disposed on" and "over" may be used to indicate that two or more elements are in direct physical contact with one another. Also, the term "on,", "overlying," "disposed on," and "over", may mean that two or more elements are not in direct contact with one another. For example, "over" may mean that one element is above another element while not contacting one another and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

In various embodiments, materials are provided for forming a PPTC device, where the PPTC device is configured to operate as a resettable fuse, to operate at relatively high trip temperatures and to operate over extended time at high temperature, while degradation of device properties are acceptably low. In various embodiments, a high trip-temperature PPTC is formed using a select combination of fluoropolymer and conductive filler, and thermal stabilizer. According to some embodiments a PPTC device may exhibit a trip temperature of 150° C. or greater, 175 degrees or greater, 200 degrees or greater, or 225 degrees or greater. The embodiments are not limited in this context.

In various embodiments, a PPTC device may be constructed as shown in FIG. 1A and FIG. 1B. FIG. 1A illustrates a side cross-sectional view of a PPTC device 100, where a PPTC body 104 is disposed between a first electrode 102 and a second electrode 106, arranged on a first side and a second side, respectively. FIG. 1B illustrates a configuration of the PPTC device 100 after a first terminal 108 is joined to the first electrode 102 and a second terminal 110 is joined to the second electrode 106. According to embodiments of the disclosure, the PPTC body 104 may be formed from a relatively low melting temperature polymer as detailed below. The first electrode 102 and second electrode 106 may be formed of known metals, such as a copper foil. In some embodiments, the copper foil may be nickel plated. The first terminal 108 and second terminal 110 may also be formed of known materials, such a copper or brass. The first terminal 108 and the second terminal 110 may form a first interface 112 and second interface 114 with the first terminal 108 and second terminal 110, such as by welding. The embodiments are not limited in this context.

In some embodiments, the PPTC body may be formed from an ethylene tetrafluoroethylene copolymer (ETFE), polytetrafluoroethylene (PTFE), polychlorotrifluoroethylene, perfluoroalkoxy alkane, or tetrafluoroethylene-perfluoropropylene, polyvinylidene fluoride, other fluoropolymer or other fluorine-containing polymer. The embodiments are not limited in this context. The PPTC body may further include any suitable electrically conductive filler, such as a metal filler, including nickel, copper; a carbon filler, such as carbon black or graphite, a conductive ceramic filler, such as tungsten carbide or titanium carbide. The embodiments are not limited in this context. In some embodiments, the conductive filler may be formed using conductive particles having an irregular shape, spherical particles, fibers, flakes, or dendritic particles. In various embodiments, the particle size of conductive filler particles may range from 50 nm to 100 μm. According to various embodiments, the volume fraction of conductive filler may range from 5% to 55%.

The configuration of a PPTC device may vary according to different embodiments of the disclosure. FIG. 1C presents a top plan view of a PPTC device 400, shown as radial lead PPTC, including bottom lead 404 and top lead 406, attached to opposite surfaces of a PPTC body 402. The PPTC body 402 may have first and second electrodes (not separately shown) attached to the top surface and bottom surface, respectively, as generally described above. The PPTC device 400 may be encapsulated by an encapsulant layer, such as an epoxy.

Figure 1D:
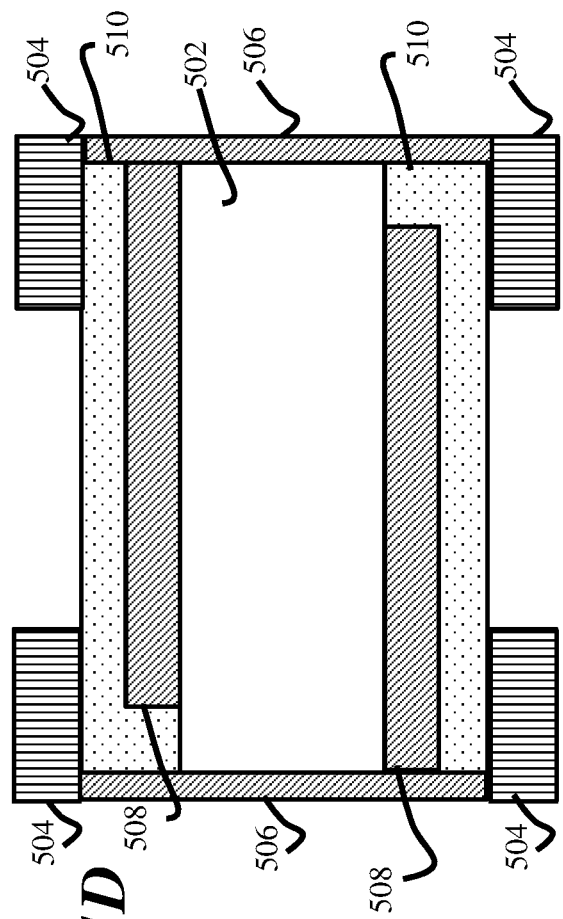
Figure 1E:
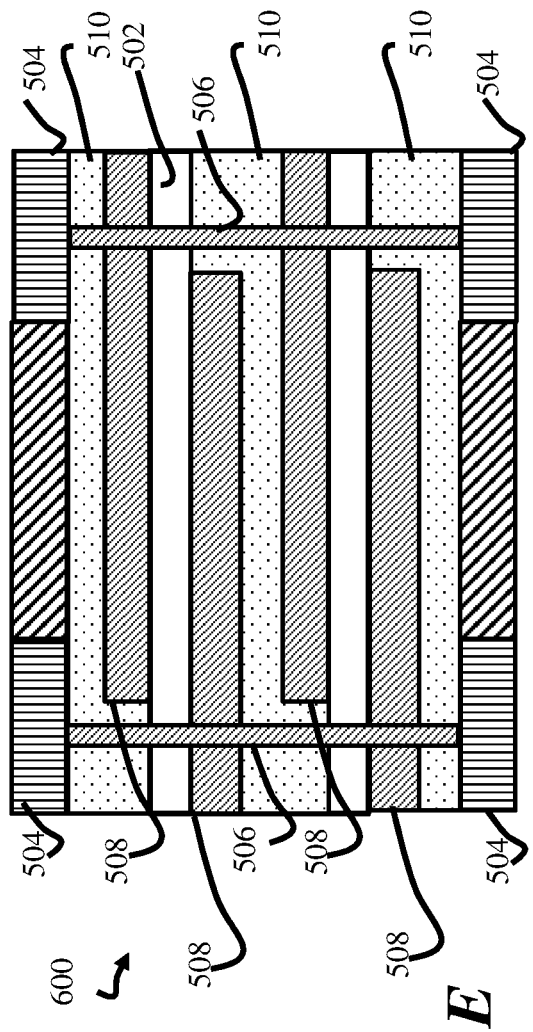

FIG. 1D and FIG. 1E depict side cross-sectional views of embodiments of a single layer surface mount PPTC device, shown as PPTC device 500, and a double layer surface mount PPTC device, shown as PPTC device 600, according to different embodiments of the disclosure. In these additional devices, the PPTC body 502 may be formulated generally as described above. The PPTC device 500 and PPTC device 600 each have similar components, including metal electrodes 504, metal structures 506, metal foil electrode 508, PTC layer 502, insulation layer 510, and solder mask.

Figure 2:
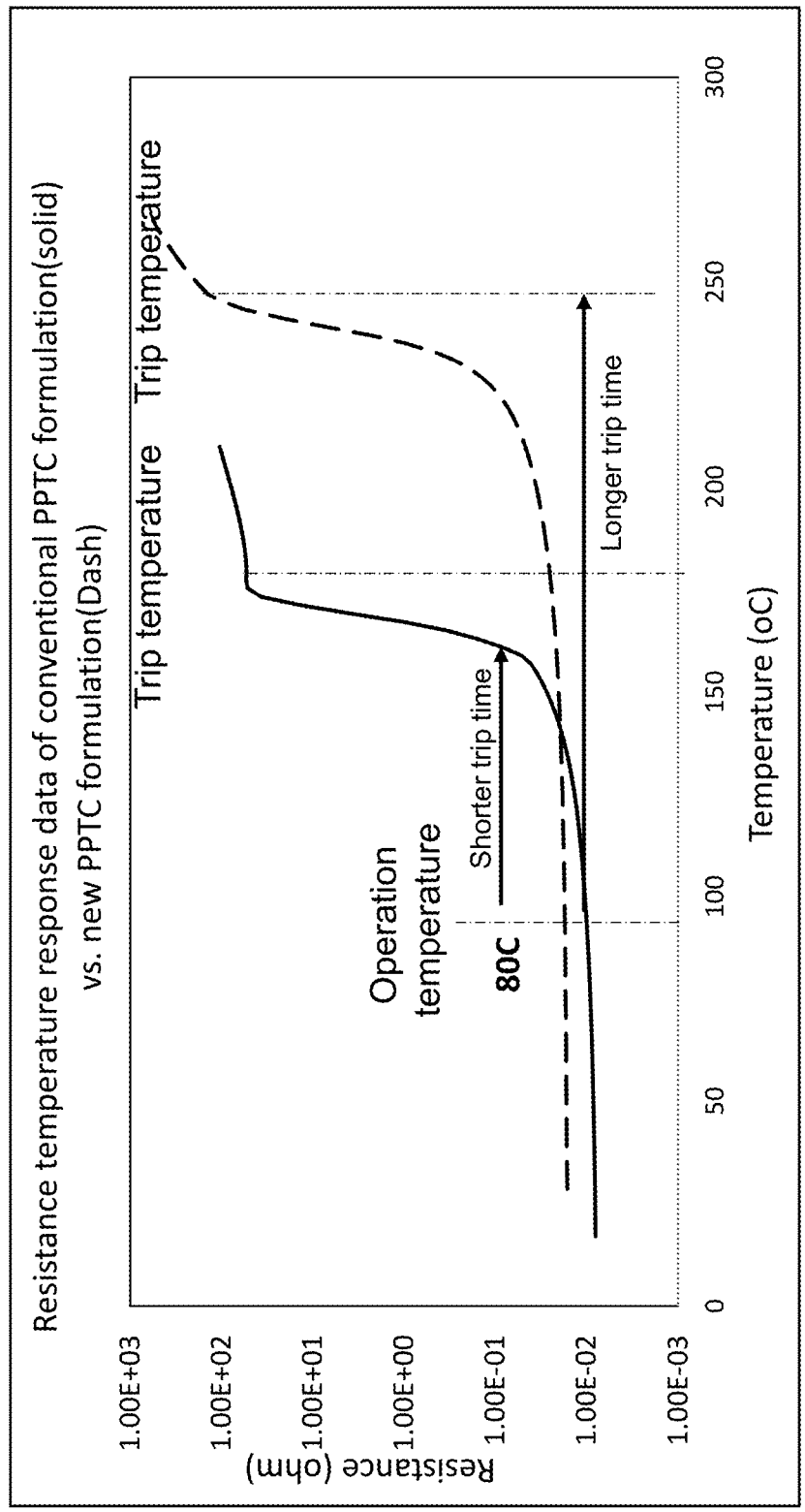
FIG. 2 there is shown a graph plotting the resistance behavior as a function of temperature of a known PPTC material, and a PPTC device material arranged according to embodiments of the disclosure.

Turning now to FIG. 2 there is shown a graph plotting the resistance behavior as a function of temperature of a known PPTC material, and a PPTC device material arranged according to embodiments of the disclosure. In this example, the known PPTC device material, whose behavior is shown by the solid curve, is formed using a polymer matrix of PVDF, where the melting temperature of the polymer is 177 C. The PPTC device material of the dashed curve is formed from a ETFE polymer, having a melting temperature of 255 C.

When applied in a PPTC device, such as shown in FIG. 1A, the ETFE polymer material may generate a longer trip time, since the PPTC device needs to heat up to a higher temperature before a transition to a high resistance state takes place. Accordingly, in the presence of excessive current, a PPTC device using the material of the dashed curve, will not trip as quickly as a PPTC device using the material of the solid curve.

In accordance with various embodiments, the present inventors have found that the addition of a small portion of a material that is deemed "a thermal stabilizer" may enhance the properties of a PPTC material, such as a fluoropolymer-based PPTC material. In accordance with various embodiments, a material such as an oxide in granular form may be added in a range of volume percent range of approximately 1-20% within a matrix that includes a fluoropolymer material and a conductive filler. Notably, the addition of the thermal stabilizer was discovered to enhance the properties including long term performance of PPTC devices.

While a PPTC based upon ETFE as the matrix polymer may provide a delayed trip, due to the higher melting temperature as opposed to other PPTC materials, such as PVDF or polyethylene, the ETFE polymer matrix may nonetheless be susceptible to degradation due to operation at elevated temperatures over a long duration, whether over a single long term event, or over multiple events where the PPTC material is exposed to high temperatures.

In a series of experiments, a series of different thermal stabilizer additives were mixed into a polymer matrix of ETFE. The thermal stabilizer was added as a powder and mixed into the polymer in a melt form, then pressed into PPTC formula samples that were arranged as 0.5 mm thick square slabs, having a side dimension of 4 cm×4 cm. Thermal aging was monitored by observation of changes in appearance of the samples, including color changes and other changes, when the samples were exposed to elevated temperature. In particular, FIG. 3 presents a summary view of results from exposure of various PPTC formula samples after exposure to 285 C in air. As observed, a control sample where no stabilizer powder was added to an ETFE polymer was heavily degraded, turning a dark brown color (from an initial white color) with many bubbles, as well as small brown dots. In contrast, when 4% by volume zinc oxide (ZnO) was added to an ETFE polymer matrix, the resulting mixture turned somewhat yellow after exposure to 285 C in air, and exhibited no brown dots or bubbles. When 4% by volume titanium dioxide ($TiO_2$) was added to an ETFE polymer matrix, the resulting mixture turned somewhat yellow, and exhibited no bubbles, while showing small brown dots. When 4% by volume antimony oxide ($Sb_2O_3$) was added to an ETFE polymer matrix, the resulting mixture turned somewhat yellow, and exhibited no bubbles, while showing small brown dots. When 4% by volume calcium carbonate was added to an ETFE polymer matrix, the resulting mixture turned to a brown color, and exhibited a small amount of bubbles compared to the ETFE sample without thermal stabilizer, while showing small brown dots. The above results show that the addition of 4% oxide powder, for various oxide materials, may yield improved thermal stability to an ETFE polymer, for use in a PPTC device configuration, such as a thin slab. Notably, the sample using zinc oxide exhibited what appears to be the least degradation.

Figure 4B:
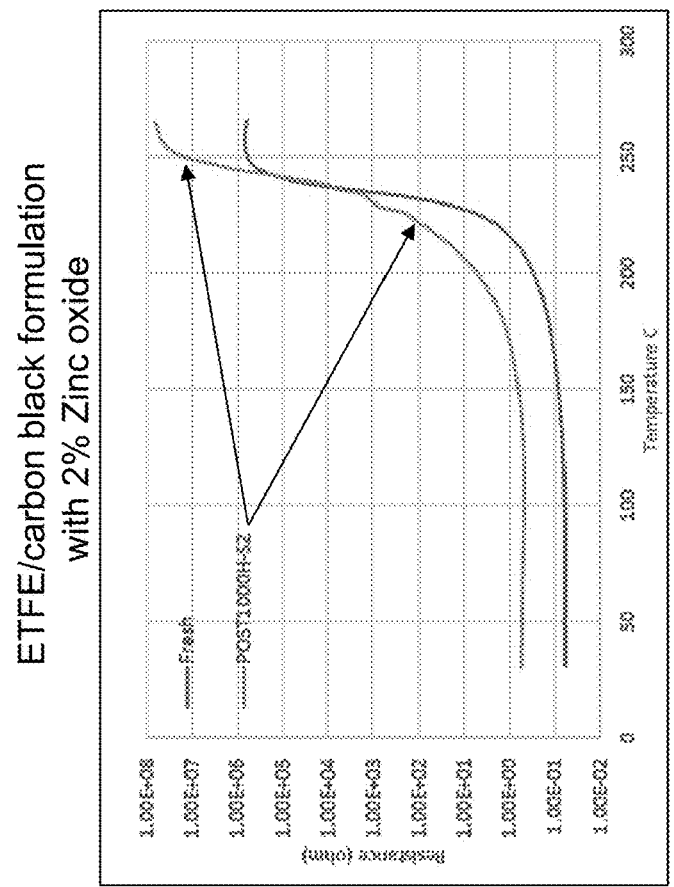
FIG. 4B shows the results of electrical behavior of a PPTC device material based upon ETFE with 2% zinc oxide, as formed, and after a 1000 hr. trip endurance, according to various additional embodiments of the disclosure.
Figure 4A:
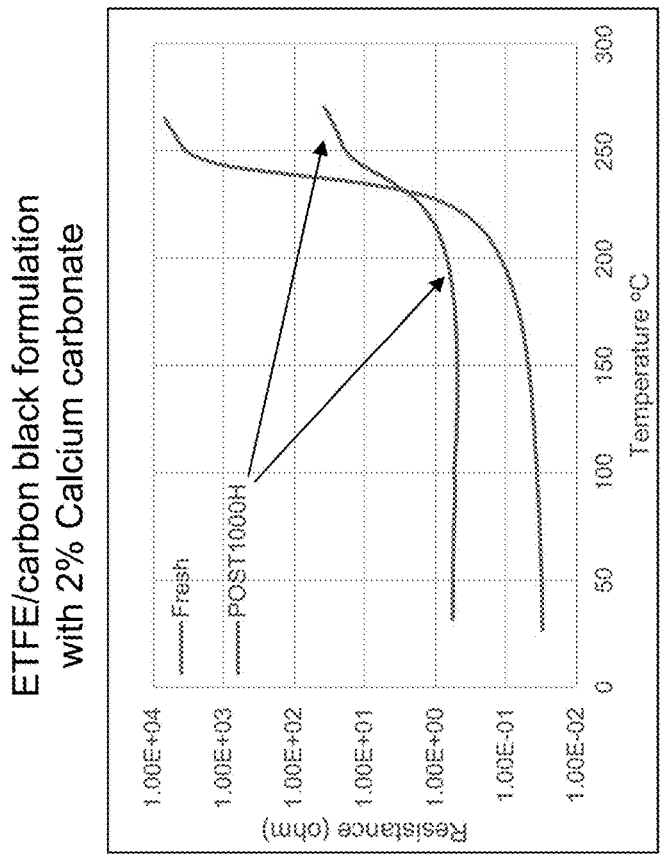
FIG. 4A shows the results of electrical behavior of a PPTC device material based upon ETFE with 2% calcium carbonate, as formed, and after a 1000 hr. trip endurance, according to various additional embodiments of the disclosure.

Without being bound to a particular theory, the PPTC samples may exhibit enhanced stability when an oxide thermal stabilizer is added to the ETFE polymer because of a reduction in polymer breakdown products, such as hydrofluoric acid (HF). Notably, HF destabilizes fluoropolymers and accelerates the degradation of the fluoropolymer. In the application to a PPTC device, the addition of small amounts of a thermal stabilizer may improve the stability due to HF scavenging performed by the thermal stabilizer, and electrical reliability for overcurrent/overheating protection, and may improve the long trip endurance. Long term trip endurance for a PPTC material may be characterized by changes in the electrical behavior of a PPTC device after exposure to long times in the tripped state, meaning long times at a temperature sufficient to induce the trip state. One such test is a 1000 hr. trip endurance. FIG. 4A shows the results of electrical behavior of a PPTC device material based upon ETFE with 2% calcium carbonate, as formed, and after a 1000 hr. trip endurance test. The trip endurance test in this case involves tripping the PPTC device and keeping the device art the melting temperature range of PPTC device (~240 C) for 1000 hr.

As formed, the material undergoes a transition to trip state at approximately 240 C, with an autotherm height of 5.4. After trip endurance, the autotherm height is much less, showing a value of 1.5. FIG. 4B shows the results of electrical behavior of a PPTC device material based upon ETFE with 2% zinc oxide, as formed, and after a 1000 hr. trip endurance test. As formed, the material undergoes a transition to trip state approximately 230 C, again with an autotherm height of 7. After trip endurance, the autotherm height approximately the same, 7.

In further experiments, an embodiment of a ETFE PPTC material based upon carbon black and 4% zinc oxide was subject to 80 C cycling to simulate automobile window cycling. While a conventional PVDF PPTC material was observed to trip after 1.5 cycles (a cycle=30% of Max stall current, 5 sec Max stall current 0.5 s, pause 1 s, at 80 C), the embodiment of the ETFE material with the 4% zinc oxide survived 13 full cycles before tripping.

While the above embodiments focus on the improvements in thermal stability of ETFE PPTC device formulations, other embodiments are contemplated where the fluoropolymer may have a lower melting temperature, such as PVDF. These materials may also be stabilized by the addition of a thermal stabilizer, including any of the aforementioned oxides. Additionally, while experiments have focused on the addition of relatively small amounts of oxide to an ETFE polymer matrix, higher volume fractions of oxide additives, such as up to 20%, should also are reasonably improve thermal stability of a PPTC material and PPTC device, while not degrading the electrical properties of a PPTC device to an unacceptable degree.

While the present embodiments have been disclosed with reference to certain embodiments, numerous modifications, alterations and changes to the described embodiments are possible while not departing from the sphere and scope of the present disclosure, as defined in the appended claims. Accordingly, the present embodiments are not to be limited to the described embodiments, and may have the full scope defined by the language of the following claims, and equivalents thereof.

What is claimed is:

1. A polymer positive temperature coefficient (PPTC) material, comprising:
    a polymer matrix, a conductive filler, and a thermal stabilizer, wherein the thermal stabilizer comprises 4% by volume antimony oxide, wherein the polymer matrix comprises ethylene tetrafluoroethylene copolymer, wherein a grain size of particles of the conductive filler is in a range of 50 nm to 100 μm, and wherein a volume fraction of the conductive filler ranges from 5% to 9%.

2. The PPTC material of claim 1, wherein the conductive filler comprises carbon black.

3. A fuse device, comprising:
    a polymer positive temperature coefficient (PPTC) body;
    a first electrode, disposed on a first side of the PPTC body;
    a second electrode, disposed on a second side of the PPTC body;
    wherein the PPTC body comprises a polymer matrix, a conductive filler, and a thermal stabilizer, wherein the thermal stabilizer comprises 4% by volume antimony oxide, wherein the polymer matrix comprises ethylene tetrafluoroethylene copolymer, wherein a grain size of particles of the conductive filler is in a range of 50 nm to 100 μm, and wherein a volume fraction of the conductive filler ranges from 5% to 9%.

4. The fuse device of claim 3, wherein the conductive filler comprises carbon black.

* * * * *